US012327653B2

(12) United States Patent
Xu et al.

(10) Patent No.: US 12,327,653 B2
(45) Date of Patent: Jun. 10, 2025

(54) LOW INDUCTANCE RADIO HEAD CABLE

(71) Applicant: Superior Essex International Inc., Atlanta, GA (US)

(72) Inventors: Bo Xu, Alpharetta, GA (US); Solomon Teshome Girma, Kennesaw, GA (US)

(73) Assignee: Superior Essex International Inc., Atlanta, GA (US)

(*) Notice: Subject to any disclaimer, the term of this patent is extended or adjusted under 35 U.S.C. 154(b) by 0 days.

(21) Appl. No.: 18/223,759

(22) Filed: Jul. 19, 2023

(65) Prior Publication Data

US 2025/0029750 A1 Jan. 23, 2025

(51) Int. Cl.

| | |
|---|---|
| ***H01B 7/02*** | (2006.01) |
| ***H01B 9/02*** | (2006.01) |
| ***H01B 11/18*** | (2006.01) |
| *H01B 3/30* | (2006.01) |
| *H01B 3/44* | (2006.01) |

(52) U.S. Cl.

CPC ......... *H01B 11/1834* (2013.01); *H01B 9/025* (2013.01); *H01B 11/1821* (2013.01); *H01B 11/1869* (2013.01); *H01B 3/305* (2013.01); *H01B 3/443* (2013.01)

(58) Field of Classification Search

CPC .............................. H01B 7/0208; H01B 7/226

See application file for complete search history.

(56) References Cited

U.S. PATENT DOCUMENTS

| | | | | |
|---|---|---|---|---|
| 10,718,918 | B1 * | 7/2020 | Evans | H01B 3/44 |
| 2016/0365174 | A1 * | 12/2016 | Gareis | H01B 11/1804 |
| 2017/0352451 | A1 * | 12/2017 | Campbell | H01B 7/0009 |
| 2021/0265079 | A1 * | 8/2021 | Carothers | H01B 7/228 |
| 2022/0208417 | A1 * | 6/2022 | Baeck | H01B 9/005 |

FOREIGN PATENT DOCUMENTS

CN 212907153 * 4/2021

* cited by examiner

*Primary Examiner* — Chau N Nguyen

(74) *Attorney, Agent, or Firm* — Rhett White

(57) ABSTRACT

A radio head cable may include an inner conductor and an outer conductor coaxially arranged around the inner conductor. The inner conductor may have a first direct current resistance and a cross-sectional area of at least 5.0 square millimeters. The outer conductor may have a second direct current resistance equal to or less than the first direct current resistance. A first dielectric layer including polyvinylchloride may be positioned between the inner conductor and the outer conductor. A second dielectric layer including polyvinylchloride may be positioned around the outer conductor, and a third dielectric layer including nylon may be positioned around the second dielectric layer.

12 Claims, 2 Drawing Sheets

LOW INDUCTANCE RADIO HEAD CABLE

TECHNICAL FIELD

Embodiments of the disclosure relate generally to radio head cables and, more particularly, to radio cables with coaxial conductors that are suitable for both dry and wet locations.

BACKGROUND

Radio head cables are typically utilized to provide power and/or communication signals to remote radio heads. For example, a cable may be used to connect a base station to a remote radio head positioned on a tower or a rooftop. Radio head cables typically include a plurality of insulated conductors, and insulation materials are selected based upon a desired installation environment for the cable. In order to satisfy applicable thermoplastic high heat resistant nylon coated ("THHN"), thermoplastic water resistant ("TW"), thermoplastic heat and water resistant ("THN"), thermoplastic heat and water resistant nylon coated ("THWN"), or other suitable requirements set forth in the UL 83 standard, the conductors of radio head cables are often insulated with specific materials, such as polyvinylchloride and nylon materials.

However, conventional radio head cables typically include conductors that are individually insulated. For example, multiple conductors are formed with respective PVC and nylon insulation layers, and the multiple conductors are incorporated into a final cable. These conventional constructions result in cables with relatively larger outer diameters and relatively higher weights. Accordingly, there is an opportunity for improved radio head cables suitable for both dry and wet locations. There is further an opportunity for improved radio head cables having constructions that result in reduced diameters and/or reduced weights.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
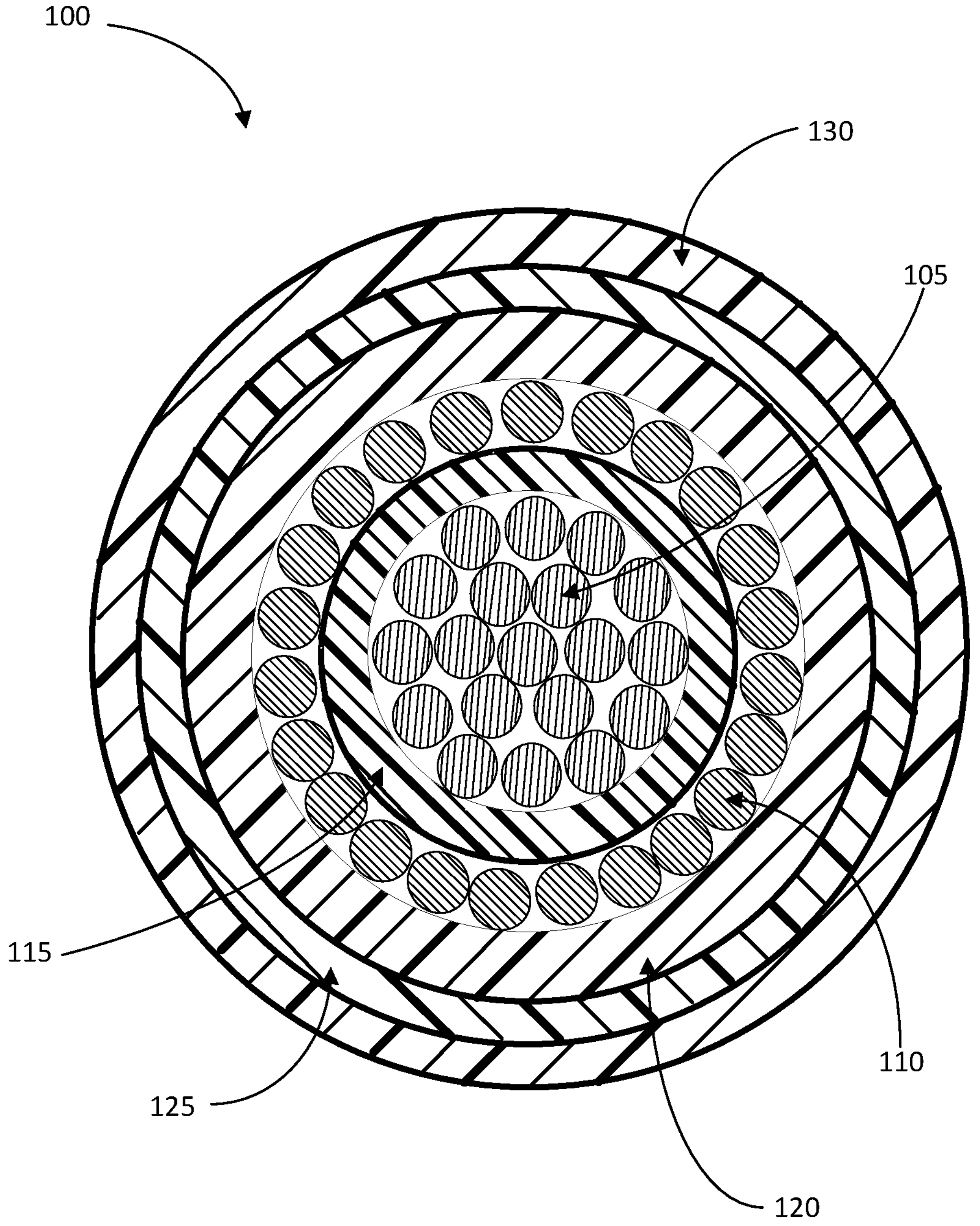
FIGS. 1-2 depict cross-sectional views of example radio head cables that include coaxial conductors and nylon insulation formed around an outer conductor, according to illustrative embodiments of the disclosure.

Various embodiments of the present disclosure are directed to radio head cables that include coaxial conductors. In certain embodiments, a cable may include an inner conductor and an outer conductor may be coaxially arranged around the inner conductor. The inner conductor may have a cross-sectional area of at least 2.0 square millimeters. For example, the inner conductor may be at least a 14 American Wire Gauge ("AWG") conductor. In certain embodiments, the inner conductor may have a cross-sectional area of at least 5.0 square millimeters. For example, the inner conductor may be at least a 12 AWG conductor. In certain embodiments, the inner conductor may have a cross-sectional area between that of a 14 AWG and a 4 AWG conductor. In certain embodiments, the inner conductor may be formed from a plurality of conductive elements or strands. For example, the inner conductor may be formed from a plurality of conductive elements that are helically stranded together. Each conductive element or strand of the inner conductor may have any suitable gauge, diameter, or cross-sectional area. For example, the inner conductor may be formed from a plurality of 20 AWG strands. The inner conductor may also have a first direct current ("DC") resistance.

In certain embodiments, the outer conductor may be formed from a plurality of conductive elements or strands. For example, the outer conductor may be formed from a plurality of conductive elements that are helically wrapped around a dielectric layer positioned between the inner and outer conductors. Each conductive or strand of the outer conductor may have any suitable gauge, diameter, or cross-sectional area. For example, the outer conductor may be formed from a plurality of 20 AWG strands. According to an aspect of the disclosure, the outer conductor may have a second DC resistance that is equal to or less than the first DC resistance. In certain embodiments, the first DC resistance and the second DC resistance may be approximately equal. As desired, the inner conductor and the outer conductor may constitute a balanced pair of conductors. For example, a first conductor may be used as a downstream conductor while the second conductor may be used as a return conductor during the transmission of a power signal. In other embodiments, the outer conductor may be used as a ground conductor.

Additionally, a first dielectric layer may be positioned between the inner conductor and the outer conductor. In certain embodiments, the first dielectric layer may include polyvinylchloride ("PVC"). A second and a third dielectric layer may then be formed or positioned around the outer conductor. In certain embodiments, the second dielectric layer may include PVC, and the third dielectric layer may include nylon. As desired in certain embodiments, a fourth dielectric layer including nylon may optionally be formed around the first dielectric layer between the inner and outer conductors. Additionally, in certain embodiments, an outer jacket may be formed around the third dielectric layer.

As a result of forming both PVC and nylon dielectric layer around the outer conductor, a radio head cable having concentric conductors may be suitable for both dry and wet environments while having a smaller diameter or cross-sectional area than conventional cables that include two separate insulated conductors (e.g., cables having two separate conductors that both include PVC and nylon insulation, etc.). For example, a cable may be formed that satisfies thermoplastic high heat resistant nylon coated and/or thermoplastic heat and water resistant nylon coated standards. In certain embodiments, a cable may satisfy a THHN, THWN, and/or a THWN-2 rating or standard, as set forth in the sixteenth edition of the UL 83 standard published on Jul. 28, 2017 by UL. The cable may also have a diameter or cross-sectional area that is smaller than conventional radio head cables. For example, the cable may have a cross-sectional area less than 120 square millimeters.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 depicts a cross-sectional view of an example radio head cable 100 that includes coaxial conductors and that is suitable for wet and dry locations, according to an illustrative embodiment of the disclosure. The cable 100 may include an inner conductor 105 and an outer conductor 110 coaxially arranged around the inner conductor 105. A first dielectric layer 115 may be positioned between the inner and outer conductors 105, 110. A second dielectric layer 120 may be formed around the outer conductor 110, and a third dielectric layer 125 may be formed around the second dielectric layer 120. In certain embodiments as explained in greater detail below with reference to FIG. 2, a fourth dielectric layer may optionally be positioned around the first dielectric layer 115 between the inner and outer conductors 105, 110. Additionally, a jacket 130 may optionally be formed around the third dielectric layer 125. Each of the components of the cable 100 are described in greater detail below.

The cable 100 may be suitable for use in a wide variety of desired applications. For example, the cable 100 may be suitable for use in radio head applications, such as applications in which power and/or data is communicated between a base station and a remote radio head positioned on a tower, rooftop, or other locations remote from the base station. Additionally, it will be understood that the cable 100 may be utilized to transmit a wide variety of suitable signals, such as power and/or communications signals.

With reference to the cable 100 of FIG. 1, the inner conductor 105 and the outer conductor 110 may be coaxially or concentrically arranged relative to one another. In certain embodiments, the inner and outer conductors 105, 110 may have a common central axis that extends along a longitudinal direction of the cable 100. For example, the inner conductor 105 may be positioned approximately along a central axis of the cable 100, and the outer conductor 110 may be coaxially formed around the inner conductor 105.

Figure 2:
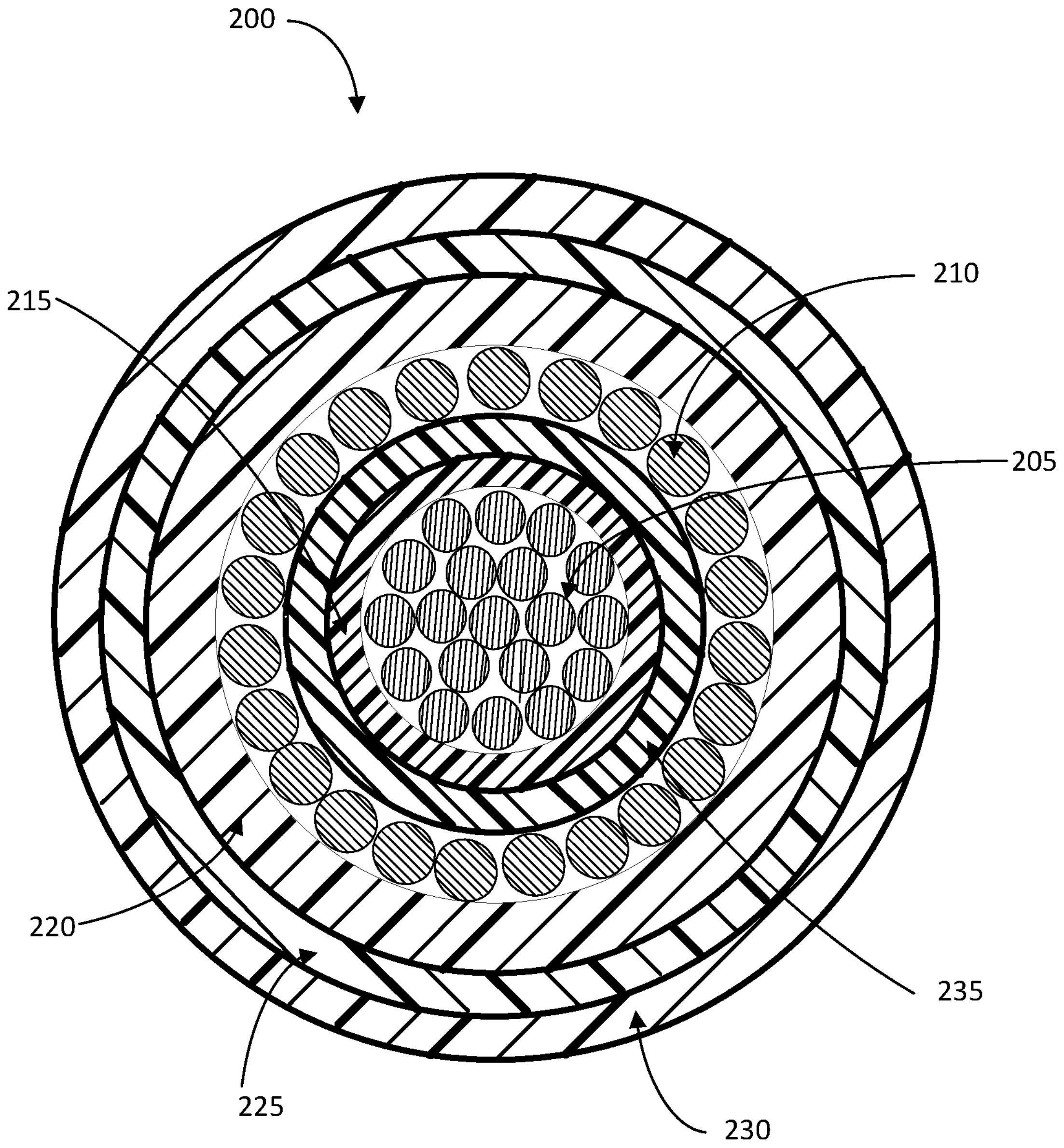

The inner conductor 105 may be formed with a wide variety of suitable constructions as desired in various embodiments. In certain embodiments, as shown in FIGS. 1 and 2, the inner conductor 105 may include a plurality of conductive elements. As desired, the plurality of conductive elements may be helically stranded or otherwise stranded together. For example, a plurality of uninsulated conductive elements in electrical contact with one another such that they form a single overall inner conductive layer may be helically stranded together. Any desired number of conductive elements may be utilized to form the inner conductor 105 in various embodiments. Additionally, the conductive elements may be helically stranded in a single layer or in a plurality of layers (e.g., a plurality of concentric layers). As desired, a plurality of conductive elements may be stranded in a single direction (e.g., clockwise, counterclockwise) or in at least two directions (e.g., different layers stranded in clockwise and counterclockwise directions, etc.). In other embodiments, the inner conductor 105 may include a plurality of braided conductive elements. Any suitable number of conductive elements may be utilized to form a braid.

In the event that a plurality of conductive elements are utilized to form the inner conductor 105, any number of conductive elements may be used. For example, as shown in FIG. 1, nineteen conductive elements or strands may be used. As another example, seven conductive elements may be utilized. Other numbers of conductive elements may be utilized in other embodiments. Additionally, each of the conductive elements may be formed as either a solid conductor or as a stranded conductor (with any suitable number of strands). Further, each of the conductive elements may be formed with any suitable gauge, cross-sectional area, and/or other dimensions. For example, in certain embodiments, each of the conductive elements may be approximately a 20 AWG conductor. As another example, each of the conductive elements may have a cross-sectional area of at least 0.5 square millimeters. Other suitable sizes may be utilized as desired for the conductive elements used to form the inner conductor 105.

The inner conductor 105 and/or any conductive elements incorporated into the inner conductor 105 may be formed from any suitable conductive material or combination of materials. For example, the inner conductor 105 (or any conductive elements) may be formed from any suitable electrically conductive material, such as copper, aluminum, silver, annealed copper, gold, a conductive alloy, conductive composite materials, carbon nanotubes, etc. Indeed, suitable electrically conductive materials may include any material having an electrical resistivity of less than approximately $1\times10^{-7}$ ohm meters at approximately 20° C., such as an electrical resistivity of less than approximately $3\times10^{-8}$ ohm meters at approximately 20° C.

Regardless of the construction utilized to form the inner conductor 105, the inner conductor 105 may be formed with a wide variety of suitable overall dimensions, such as any suitable gauge, cross-sectional area, diameter, and/or thickness. The gauge, cross-sectional area, and/or diameter may be selected in various embodiments to provide the inner conductor 105 with one or more desired electrical properties. For example, in certain embodiments, the inner conductor 105 may be sized in order to facilitate transmission of a desired power signal via the cable 100. In certain embodiments, the inner conductor 104 may be configured to carry a current of at least 25.0 amps at 90° C. For example, the inner conductor 115 may carry a current between approximately 25.0 and approximately 95 amps at 90° C. In various embodiments, the inner conductor 105 may carry a current of approximately 25, 30, 35, 40, 45, 50, 55, 60, 70, 85, or 95 amps at 90° C., a current included in a range bounded on the minimum end by one of the above values, or a current included in a range between any two of the above values. In certain embodiments, the inner conductor 115 may be configured to carry any suitable power signal, such as a power signal of at least 95 watts.

In certain embodiments, the inner conductor 105 may have a cross-sectional area of at least 2.0 square millimeters. For example, the inner conductor 105 may be at least a 14 AWG conductor. In other embodiments, the inner conductor 105 may have a cross-sectional area of at least 5.0 square millimeters. For example, the inner conductor may be at least a 12 AWG conductor. In certain embodiments, the inner conductor may have a cross-sectional area between that of a 14 AWG and a 4 AWG conductor. For example, the inner conductor 105 may have a cross-sectional area approximately equal to a 14, 13, 12, 11, 10, 9, 8, 7, 6, 5, or 4 AWG conductor, or a cross-sectional area included in a range between any two of the above conductor sizes. Additionally, the inner conductor 105 may be formed to include any suitable direct current ("DC") resistance. For purposes of this disclosure, the inner conductor 105 may have a first DC resistance. In various example embodiments, the inner conductor 105 may have a DC resistance between 0.5127 and 66.79 mΩ/m at 20° C., such as a DC resistance between 0.848 and 8.62 mΩ/m at 20° C. As desired, the inner conductor 105 may have a DC resistance of approximately 0.5127, 1.0, 2.5, 3.0, 5.0, 6.571, 10.0, 15.0, 25.0, 40.0, 50.0, or 66.79 mΩ/m at 20° C., a DC resistance included in a range bounded on either the minimum or maximum end by one of the above values, or a DC resistance included in a range between any two of the above values.

With continued reference to FIG. 1, the outer conductor 110 may be concentrically formed around the inner conductor 105, and at least one dielectric layer 115 (e.g., a first dielectric layer) may be positioned between the inner and outer conductors 105, 110. In certain embodiments, the outer conductor 110 may surround, encircle, or completely entrap the dielectric layer(s) (e.g., a first dielectric layer 115, etc.) and the inner conductor 105. Additionally, in certain embodiments, the outer conductor 110 may be in direct contact with the first dielectric layer 115 or an outer dielectric layer positioned between the conductors 105, 110. For example, the outer conductor 110 may be in direct contact with the outer surface or outer periphery of an outer dielectric layer positioned between the conductors 105, 110 along a longitudinal length of the cable 100 (other than at terminations).

The outer conductor 110 may be formed with a wide variety of suitable constructions as desired in various embodiments. In certain embodiments, as shown in FIGS. 1 and 2, the outer conductor 110 may include a plurality of conductive elements. As desired, the plurality of conductive elements may be helically stranded or otherwise stranded around the dielectric layer(s) positioned between the inner and outer conductors 105, 110. For example, a plurality of uninsulated conductive elements in electrical contact with one another such that they form a single overall outer conductive layer may be helically stranded around the dielectric layer(s) positioned between the conductors 105, 110 (e.g., the first dielectric layer). Any desired number of conductive elements may be utilized to form the outer conductor 110 in various embodiments. Additionally, the conductive elements may be helically stranded in a single layer or in a plurality of layers (e.g., a plurality of concentric layers). As desired, a plurality of conductive elements may be stranded in a single direction (e.g., clockwise, counterclockwise) or in at least two directions (e.g., different layers stranded in clockwise and counterclockwise directions, etc.). In other embodiments, the outer conductor 110 may include a plurality of braided conductive elements. Any suitable number of conductive elements may be utilized to form a braid.

In the event that a plurality of conductive elements are utilized to form the outer conductor 110, any number of conductive elements may be used. For example, as shown in FIG. 1, nineteen conductive elements or strands may be used. Other numbers of conductive elements may be utilized in other embodiments. Additionally, each of the conductive elements may be formed as either a solid conductor or as a stranded conductor (with any suitable number of strands). Further, each of the conductive elements may be formed with any suitable gauge, cross-sectional area, and/or other dimensions. For example, in certain embodiments, each of the conductive elements may be approximately a 20 AWG conductor. As another example, each of the conductive elements may have a cross-sectional area of at least 0.5 square millimeters. Other suitable sizes may be utilized as desired for the conductive elements used to form the outer conductor 110. For ease of understanding, if both the inner and outer conductors 105, 110 include a plurality of conductive elements, the inner conductor 105 may include a first plurality of conductive elements while the outer conductor 110 includes a second plurality of conductive elements.

In other embodiments, the outer conductor 110 may be formed as a tube or single continuous layer of conductive material. However, forming the outer conductor 110 as a tube may reduce the overall flexibility of the cable 100, and the reduction of flexibility may increase as the overall cable diameter and the outer conductor dimensions increase. In the event that the outer conductor 110 is formed as a tube, the outer conductor may have any suitable dimensions, such as any suitable inner diameter, outer diameter, cross-sectional area, and/or thickness. For example, the inner diameter may be approximately equal to the outer diameter of the dielectric layer(s) positioned between the conductors 105, 110. The outer diameter and thickness may be selected in various embodiments to provide the outer conductor 110 with a desired power transmission capability, direct current resistance, and/or other suitable electrical properties.

The outer conductor 110 and/or any conductive elements incorporated into the outer conductor 110 may be formed from any suitable conductive material or combination of materials. For example, the outer conductor 110 (or any conductive elements) may be formed from any suitable electrically conductive material, such as copper, aluminum, silver, annealed copper, gold, a conductive alloy, conductive composite materials, carbon nanotubes, etc. Indeed, suitable electrically conductive materials may include any material having an electrical resistivity of less than approximately $1\times10^{-7}$ ohm meters at approximately 20° C., such as an electrical resistivity of less than approximately $3\times10^{-8}$ ohm meters at approximately 20° C. In certain embodiments, the inner conductor 105 and the outer conductor 110 may be formed from the same conductive material, such as copper. In other embodiments, the inner conductor 105 and the outer conductor 110 may be formed from different conductive materials.

Regardless of the construction utilized to form the outer conductor 110, the outer conductor 120 may be formed with a wide variety of suitable overall dimensions, such as any suitable inner diameter, outer diameter, cross-sectional area, and/or thickness. For example, the outer conductor 110 may have an inner diameter that is approximately equal to the outer diameter of the dielectric layer(s) positioned between the conductors 105, 110. The outer diameter, cross-sectional area, and/or thickness may be selected in various embodiments to provide the outer conductor 110 with one or more desired electrical properties. For example, in certain embodiments, the outer conductor 110 may be sized in order to facilitate transmission of a desired power signal via the cable 100. In certain embodiments, the outer conductor 110 may be configured to carry a current of at least 25.0 amps at 90° C. For example, the outer conductor 110 may carry a current between approximately 25.0 and approximately 95 amps at 90° C. In various embodiments, the outer conductor 110 may carry a current of approximately 25, 30, 35, 40, 45, 50, 55, 60, 70, 85, or 95 amps at 90° C., a current included in a range bounded on the minimum end by one of the above values, or a current included in a range between any two of the above values. In certain embodiments, the outer conductor 110 may be configured to carry any suitable power signal, such as a power signal of at least 95 watts.

In certain embodiments, the outer conductor 110 may have a cross-sectional area of at least 2.0 square millimeters. For example, the outer conductor 110 may have a cross-sectional area that is at least that a 14 AWG conductor. In other embodiments, the outer conductor 110 may have a cross-sectional area of at least 5.0 square millimeters. For example, the outer conductor 110 may have a cross-sectional area that is at least that of a 12 AWG conductor. In certain embodiments, the outer conductor 110 may have a cross-sectional area that is between that of a 14 AWG and a 4 AWG conductor. For example, the outer conductor 110 may have a cross-sectional area approximately equal to a 14, 13, 12, 11, 10, 9, 8, 7, 6, 5, or 4 AWG conductor, or a cross-sectional area included in a range between any two of the above conductor sizes.

Additionally, the outer conductor 110 may be formed to include any suitable direct current ("DC") resistance. For purposes of this disclosure, the outer conductor 110 may have a second DC resistance. In various example embodiments, the outer conductor 110 may have a DC resistance between 0.5127 and 66.79 mΩ/m at 20° C. For example, the outer conductor 120 may have a DC resistance of approximately 0.5127, 1.0, 2.5, 3.0, 5.0, 6.571, 10.0, 15.0, 25.0, 40.0, 50.0, or 66.79 mΩ/m at 20° C., a DC resistance included in a range bounded on either the minimum or maximum end by one of the above values, or a DC resistance included in a range between any two of the above values.

According to an aspect of the disclosure, the inner conductor 105 may have a first direct current ("DC") resistance, and the outer conductor 110 may have a second DC resistance that is equal to or less than the first DC resistance. In certain embodiments, the first DC resistance and the second DC resistance may be approximately equal. As desired, the inner conductor 105 and the outer conductor 110 may constitute a balanced pair of conductors. For example, a first conductor (e.g., one of the inner or outer conductors) may be used as a downstream conductor while the second conductor may be used as a return conductor during the transmission of a power signal. In other embodiments, the outer conductor 110 may be used as a ground conductor. When the outer conductor 110 is used as a ground, the second DC resistance may either be approximately equal to the first DC resistance or less than the first DC resistance. As desired in other embodiments, the inner and outer conductors 105, 110 of the cable 100 may be utilized to transmit communications signal as an alternative to or in addition to transmitting power signals.

With continued reference to the cable 100, a first dielectric layer 115 may be positioned between the inner conductor 105 and the outer conductor 110. For example, the first dielectric layer 115 may be formed around the inner conductor 105, and the outer conductor 110 may be formed around the first dielectric layer 115 (and any other dielectric layers positioned between the conductors 105, 110). The first dielectric layer 115 may function as insulation between the two conductors 105, 110. The first dielectric layer 115 may be formed from any suitable material and/or combination of materials. In certain embodiments, the first dielectric layer 115 may be formed from or include a melt processable thermoplastic polymeric material. In certain embodiments, the first dielectric layer 115 may be formed from or may include polyvinyl chloride ("PVC"). In other embodiments, the first dielectric layer 115 may be formed from other suitable materials, including, but are not limited to, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, etc.

The first dielectric layer 115 may also be formed with a wide variety of suitable dimensions, such as any suitable thickness and/or cross-sectional area. In certain embodiments, a thickness and/or other dimensions of the dielectric layer 115 may be based at least in part on the dimensions of the inner and/or outer conductors 105, 110 and/or a desired separation distance between the two conductors 105, 110. Additionally, in various embodiments, a thickness and/or other dimensions of the dielectric layer 115 may be based at least in part upon desired electrical properties for the cable 100, such as a desired inductance and/or capacitance. In certain embodiments, the first dielectric layer 115 may have a thickness between approximately 0.38 mm and 20 mm. In various embodiments, the first dielectric layer 115 may have a thickness of approximately 0.38, 0.9, 2.5, 5.0, 7.5, 10.0, 12.5, 15.0, 17.50, or 20 mm, a thickness included in a range between any two of the above values, or a thickness included in a range bounded on a maximum end by one of the above values.

Additionally, the first dielectric layer 115 may occupy any desired portion or percentage of the volume between the inner and outer conductors 105, 110. For example, in certain embodiments, the first dielectric layer 115 may be formed as a solid component or as a solid layer between the inner conductor 105 and the outer conductor 110. In other embodiments, the first dielectric layer 105 may be formed as a foamed layer or as a layer that includes spaces between a plurality of sections or components such that the dielectric material does not occupy the entire volume between the conductors 105, 110. For example, the first dielectric layer 115 may be formed in a plurality of sections that are radially spaced around an outer circumference of the inner conductor 105.

As desired, the first dielectric layer 115 may be formed as a single layer (e.g., a single layer of PVC, etc.) or, alternatively, may include any suitable number of sublayers. If a plurality of sublayers are used, in certain embodiments, each of the sublayers may be formed from the same material. In other embodiments, at least two sublayers may be formed from different materials. Further, a wide variety of suitable methods and/or techniques may be utilized to form the first dielectric layer 115. In certain embodiments, the dielectric layer 115 may be extruded by one or more suitable extrusion crossheads or other extrusion assemblies. Additionally, the first dielectric layer 115 may be formed as either solid insulation, foamed insulation, or with a combination of solid and foamed sublayers.

With continued reference to the cable 100, a second dielectric layer 120 and a third dielectric layer 125 may be formed around the outer conductor 110. The second and third dielectric layers 120, 125 may facilitate the cable 100 satisfying one or more suitable standards associated with wet and dry location radio head cables, such as a THHN, THWN, and/or a THWN-2 rating or standard, as set forth in the sixteenth edition of the UL 83 standard published on Jul. 28, 2017 by UL. The second dielectric layer 120 may be formed from any suitable material and/or combination of materials. In certain embodiments, the second dielectric layer 120 may be formed from or include a melt processable thermoplastic polymeric material. In certain embodiments, the second dielectric layer 120 may be formed from or may include polyvinyl chloride ("PVC").

The second dielectric layer 120 may also be formed with a wide variety of suitable dimensions, such as any suitable thickness and/or cross-sectional area. In certain embodiments, a thickness and/or other dimensions of the second dielectric layer 120 may be based at least in part upon desired electrical properties for the cable 100 and/or with requirements of one or more standards (e.g., THHN, THWN, THWN-2, etc.) to be satisfied by the cable 100. In certain embodiments, the second dielectric layer 120 may have a thickness between approximately 0.38 mm and 20 mm. In various embodiments, the second dielectric layer 120 may have a thickness of approximately 0.38, 0.9, 2.5, 5.0, 7.5, 10.0, 12.5, 15.0, 17.50, or 20 mm, a thickness included in a range between any two of the above values, or a thickness included in a range bounded on a maximum end by one of the above values.

As desired, the second dielectric layer 120 may be formed as a single layer (e.g., a single layer of PVC, etc.) or, alternatively, may include any suitable number of sublayers. If a plurality of sublayers are used, in certain embodiments, each of the sublayers may be formed from the same material. Further, a wide variety of suitable methods and/or techniques may be utilized to form the second dielectric layer 120. In certain embodiments, the second dielectric layer 120 may be extruded by one or more suitable extrusion crossheads or other extrusion assemblies.

The third dielectric layer 125 may also be formed from any suitable material and/or combination of materials. In certain embodiments, the third dielectric layer 125 may be formed from or include a melt processable thermoplastic polymeric material. In certain embodiments, the third dielectric layer 125 may be formed from or may include nylon. For example, the third dielectric layer 125 may include nylon 6, nylon 66, nylon 6/6-6, nylon 6/9, nylon 6/12, nylon 11, nylon 12, etc.

The third dielectric layer 125 may also be formed with a wide variety of suitable dimensions, such as any suitable thickness and/or cross-sectional area. In certain embodiments, a thickness and/or other dimensions of the second dielectric layer 125 may be based at least in part upon desired electrical properties for the cable 100 and/or with requirements of one or more standards (e.g., THHN, THWN, THWN-2, etc.) to be satisfied by the cable 100. In certain embodiments, the third dielectric layer 125 may have a thickness between approximately 0.1 mm and 5.0 mm. In various embodiments, the third dielectric layer 125 may have a thickness of approximately 1.0, 1.5, 2.0, 2.5, 3.0, 3.5, 4.0, 4.5, or 5.0 mm, a thickness included in a range between any two of the above values, or a thickness included in a range bounded on a maximum end by one of the above values.

As desired, the third dielectric layer 125 may be formed as a single layer (e.g., a single layer of nylon, etc.) or, alternatively, may include any suitable number of sublayers. If a plurality of sublayers are used, in certain embodiments, each of the sublayers may be formed from the same material. Further, a wide variety of suitable methods and/or techniques may be utilized to form the third dielectric layer 125. In certain embodiments, the third dielectric layer 125 may be extruded by one or more suitable extrusion crossheads or other extrusion assemblies.

As a result of forming both a second dielectric layer 120 containing PVC and a third dielectric layer 125 containing nylon around the outer conductor 110, the radio head cable 100 may be suitable for both dry and wet environments. For example, the cable 100 may satisfy high heat resistant nylon coated and/or thermoplastic heat and water resistant nylon coated standards. In certain embodiments, the cable 100 may satisfy a THHN, THWN, and/or a THWN-2 rating or standard, as set forth in the sixteenth edition of the UL 83 standard published on Jul. 28, 2017 by UL. Additionally, with respect to protecting the cable 100 from the environment and/or satisfying wet and dry standards, it will be appreciated that the second and third dielectric layers 120, 125 protect both the inner and outer conductors 105, 110 of the cable 100 due to the concentric arrangement of the conductors 105, 110.

Additionally, given the concentric conductors 105, 110 and the use of both the second and third dielectric layers 120, 125, the cable 100 may have a smaller diameter or cross-sectional area than conventional cables that include two separate insulated conductors (e.g., cables having two separate conductors that both include PVC and nylon insulation, etc.). As a result, the cable 100 may occupy less space when installed. Additionally, the smaller diameter of the cable 100 and the potential reduction of insulation layers (i.e., it is not necessary for the same insulation to be used on the inner conductor 105 as the outer conductor 110) relative to conventional cables may result in the cable 100 having a reduced weight. This reduced weight allows, for example, easier installation of the cable 100 in a vertical application (e.g., up a tower or up a rooftop).

As desired in certain embodiments, a fourth dielectric layer may optionally be incorporated into the cable 100 between the inner and outer conductors 105, 110. For example, a fourth dielectric layer containing nylon may be positioned between the first dielectric layer 115 and the outer conductor 110. FIG. 2 illustrates and describes an example cable 200 that includes a fourth dielectric layer. It will be appreciated that the cable 100 of FIG. 1 may include a similar fourth dielectric layer.

With continued reference to the cable 100, an outer jacket 130 may optionally be formed around the third dielectric layer 125. The jacket 130 may provide protection for the internal components of the cable 100. The jacket 130 may include any suitable dielectric materials and/or combination of materials. Examples of suitable dielectric materials include, but are not limited to, one or more polymeric materials, one or more polyolefins (e.g., polyethylene, polypropylene, etc.), one or more fluoropolymers (e.g., fluorinated ethylene propylene ("FEP"), melt processable fluoropolymers, MFA, PFA, ethylene tetrafluoroethylene ("ETFE"), ethylene chlorotrifluoroethylene ("ECTFE"), etc.), one or more polyesters, one or more flame retardant olefins, or a combination of any of the above materials. In certain embodiments, the jacket 130 may be formed from or may include polyethylene.

In various embodiments, the jacket 130 may be formed from one or multiple layers of material. Each layer may be formed as solid insulation, unfoamed insulation, foamed insulation, or other suitable insulation. As desired, a combination of different types of insulation may be utilized. For example, a foamed insulation layer may be covered with a solid foam skin layer. Additionally, the jacket 130 may be formed with any suitable thickness, inner diameter, outer diameter, and/or other dimensions. As desired in various embodiments, the jacket 130 may additionally include a wide variety of other materials (e.g., filler materials, materials compounded or mixed with a base insulation material, etc.), such as smoke suppressant materials, flame retardant materials, etc.

In certain embodiments, the cable 100 may be formed with smaller dimensions (e.g., a smaller diameter, a smaller cross-sectional area, etc.) than conventional radio head cables. For example, the cable 100 may have a cross-sectional area less than 120 square millimeters. As another example, the cable 100 may have a diameter less than 30 mm.

As desired, a wide variety of other components may be incorporated into the cable 100 in addition to those illustrated and described with respect to FIG. 1. For example, one or more ripcords may be incorporated into the cable jacket 130 or between the jacket 130 and the outer conductor 110. A ripcord may facilitate separating the jacket 130 from the internal components of the cable 100. As another example, one or more water blocking layers, moisture absorbing layers, strength members, and/or other desired components may be incorporated into the cable 100.

FIG. 2 depicts a cross-sectional view of another example radio head cable 200 that includes coaxial conductors and that is suitable for wet and dry locations, according to an illustrative embodiment of the disclosure. Much like the cable 100 of FIG. 1, the cable 200 may include an inner conductor 205 and an outer conductor 210 coaxially arranged around the inner conductor 205. A first dielectric layer 215 may be positioned between the inner and outer conductors 205, 210. A second dielectric layer 220 may be formed around the outer conductor 210, and a third dielectric layer 225 may be formed around the second dielectric layer 220. Additionally, a jacket 230 may optionally be formed around the third dielectric layer 225. Each of the components may be similar to those described above with reference to the cable 100 of FIG. 1.

However, in contrast to the cable 100 illustrated in FIG. 1, the cable 200 of FIG. 2 may also include a fourth dielectric layer 235 positioned between the inner and outer conductors 205, 210. In particular, the fourth dielectric layer 235 may be formed on the first dielectric layer 215, and the outer conductor 210 may be formed around the fourth dielectric layer 235. The fourth dielectric layer 235 may be formed from any suitable material and/or combination of materials. In certain embodiments, the fourth dielectric layer 235 may be formed from or include a melt processable thermoplastic polymeric material. In certain embodiments, the fourth dielectric layer 235 may be formed from or may include nylon. For example, the fourth dielectric layer 235 may include nylon 6, nylon 66, nylon 6/6-6, nylon 6/9, nylon 6/10, nylon 6/12, nylon 11, nylon 12, etc.

The fourth dielectric layer 235 may also be formed with a wide variety of suitable dimensions, such as any suitable thickness and/or cross-sectional area. In certain embodiments, a thickness and/or other dimensions of the fourth dielectric layer 235 may be based at least in part upon desired electrical properties for the cable 200 and/or a desired separation distance between the conductors 205, 210. In certain embodiments, the fourth dielectric layer 235 may have a thickness between approximately 0.1 mm and 5.0 mm. In various embodiments, the fourth dielectric layer 235 may have a thickness of approximately 0.1, 0.5, 1.0, 1.5, 2.0, 2.5, 3.0, 3.5, 4.0, 4.5, or 5.0 mm, a thickness included in a range between any two of the above values, or a thickness included in a range bounded on a maximum end by one of the above values.

As desired, the fourth dielectric layer 235 may be formed as a single layer (e.g., a single layer of nylon, etc.) or, alternatively, may include any suitable number of sublayers. If a plurality of sublayers are used, in certain embodiments, each of the sublayers may be formed from the same material. Further, a wide variety of suitable methods and/or techniques may be utilized to form the fourth dielectric layer 235. In certain embodiments, the fourth dielectric layer 235 may be extruded by one or more suitable extrusion crossheads or other extrusion assemblies.

As desired, a wide variety of other components may be incorporated into the cable 200 in addition to those illustrated and described with respect to FIG. 2. For example, one or more ripcords may be incorporated into the cable jacket 230 or between the jacket 230 and the outer conductor 210. A ripcord may facilitate separating the jacket 230 from the internal components of the cable 200. As another example, one or more water blocking layers, moisture absorbing layers, strength members, and/or other desired components may be incorporated into the cable 200.

The cables 100, 200 illustrated in FIGS. 1-2 are provided by way of example only. Embodiments of the disclosure contemplate a wide variety of other cables and cable constructions. These other cables may include more or less components than the cables 100, 200 illustrated in FIGS. 1-2. Additionally, certain components may have different dimensions and/or be formed from different materials than the components illustrated in FIGS. 1-2.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cable comprising:

an inner conductor having a first direct current resistance and a first cross-sectional area between that of a 4 AWG and a 6 AWG wire, the inner conductor formed from a first plurality of uninsulated conductive elements helically stranded together;

an outer conductor coaxially arranged around the inner conductor, the outer conductor having a second direct current resistance approximately equal to the first direct current resistance such that the inner conductor and the outer conductor comprise a balanced pair of conductors;

a first dielectric layer comprising polyvinylchloride positioned between the inner conductor and the outer conductor;

a second dielectric layer comprising polyvinylchloride positioned around the outer conductor; and a third dielectric layer comprising nylon positioned around the second dielectric layer, wherein the outer conductor is formed from a second plurality of uninsulated conductive elements helically stranded around the first dielectric layer, each of the second plurality of conductive elements comprising a second cross-sectional area of at least 0.5 square millimeters.

2. The cable of claim 1, further comprising:

a fourth dielectric layer comprising nylon positioned between the first dielectric layer and the outer conductor.

3. The cable of claim 1, further comprising:
an outer jacket formed around the third dielectric layer.

4. The cable of claim 1, wherein the cable satisfies a THHN/THWN rating as set forth by the sixteenth edition of the UL 83 Standard.

5. The cable of claim 1, wherein the cable satisfies a THWN-2 rating as set forth by the sixteenth edition of the UL 83 Standard.

6. The cable of claim 1, wherein the cable has a cross-sectional area less than 120 square millimeters.

7. A cable comprising:
an inner conductor having a first direct current resistance and a first cross-sectional area between that of a 4 AWG and a 6 AWG wire, the inner conductor formed from a first plurality of uninsulated conductive elements helically stranded together;
a first dielectric layer comprising polyvinylchloride formed around the inner conductor;
an outer conductor formed around the first dielectric layer and coaxially arranged with the inner conductor, the outer conductor having a second direct current resistance approximately equal to the first direct current resistance such that the inner conductor and the outer conductor comprise a balanced pair of conductors, wherein the outer conductor is formed from a second plurality of uninsulated conductive elements helically stranded around the first dielectric layer, each of the second plurality of conductive elements comprising a second cross-sectional area of at least 0.5 square millimeters;
a second dielectric layer comprising polyvinylchloride positioned around the outer conductor; and
a third dielectric layer comprising nylon positioned around the second dielectric layer,
wherein the cable has a cross-sectional area less than 120 square millimeters.

8. The cable of claim 7, further comprising:
a fourth dielectric layer comprising nylon positioned between the first dielectric layer and the outer conductor.

9. The cable of claim 7, further comprising:
an outer jacket formed around the third dielectric layer.

10. The cable of claim 7, wherein the cable satisfies a THWN rating as set forth by the sixteenth edition of the UL 83 Standard.

11. The cable of claim 7, wherein the cable satisfies a THWN-2 rating as set forth by the sixteenth edition of the UL 83 Standard.

12. A cable comprising:
an inner conductor having a first direct current resistance and a first cross-sectional area between that of a 4 AWG and a 6 AWG wire, the inner conductor formed from a first plurality of uninsulated conductive elements helically stranded together;
a first dielectric layer comprising polyvinylchloride formed around the inner conductor;
a second dielectric layer comprising nylon positioned around the first dielectric layer;
an outer conductor formed around the second dielectric layer and coaxially arranged with the inner conductor, the outer conductor having a second direct current resistance approximately equal to the first direct current resistance such that the inner conductor and the outer conductor comprise a balanced pair of conductors, wherein the outer conductor is formed from a second plurality of uninsulated conductive elements helically stranded around the second dielectric layer, each of the second plurality of conductive elements comprising a second cross-sectional area of at least 0.5 square millimeters;
a third dielectric layer comprising polyvinylchloride positioned around the outer conductor; and
a fourth dielectric layer comprising nylon positioned around the third dielectric layer,
wherein the cable has a cross-sectional area less than 120 square millimeters.

* * * * *